Inventors:
Clark C. Macomber
Arthur C. Mueller
By Barry L. Clark Atty.

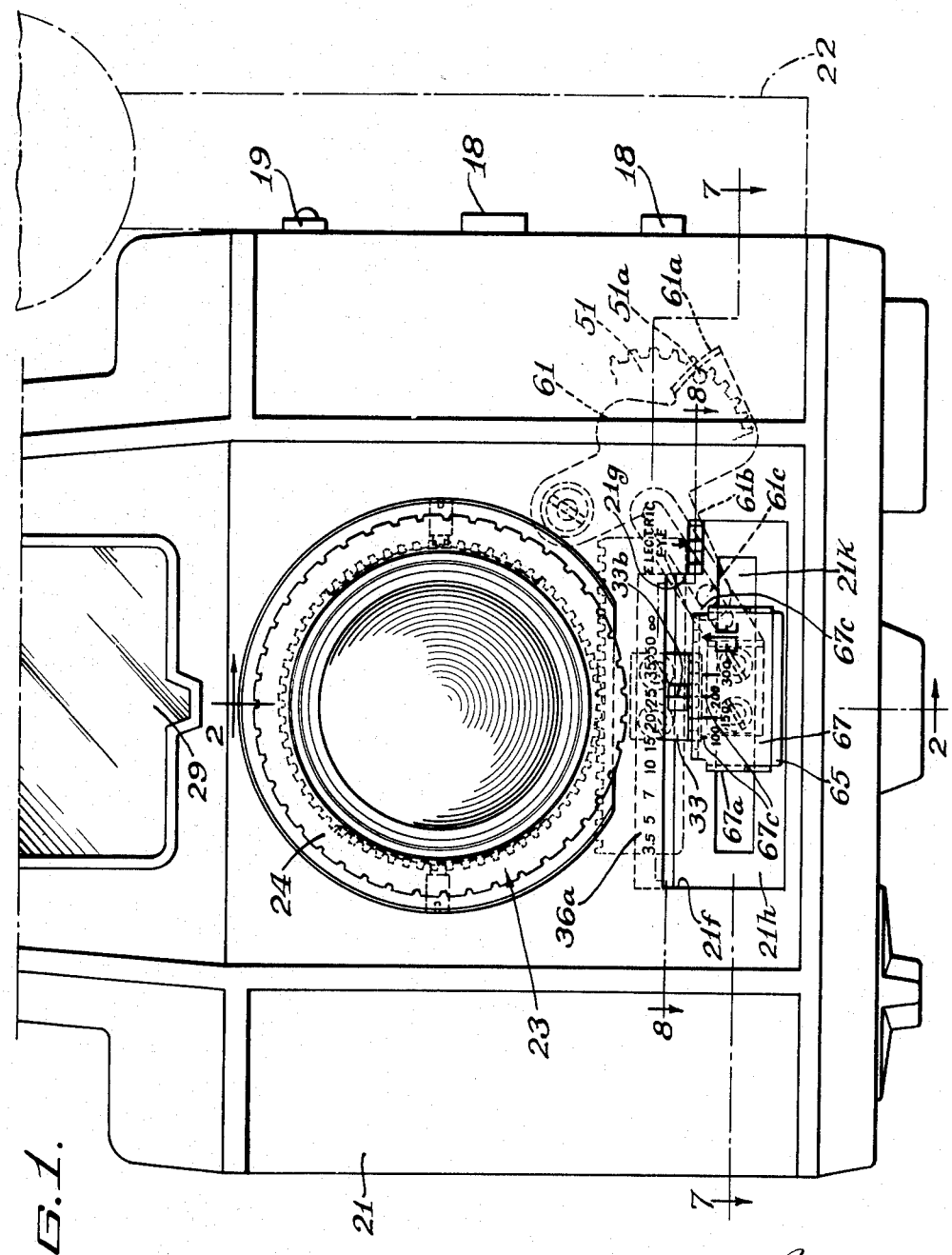

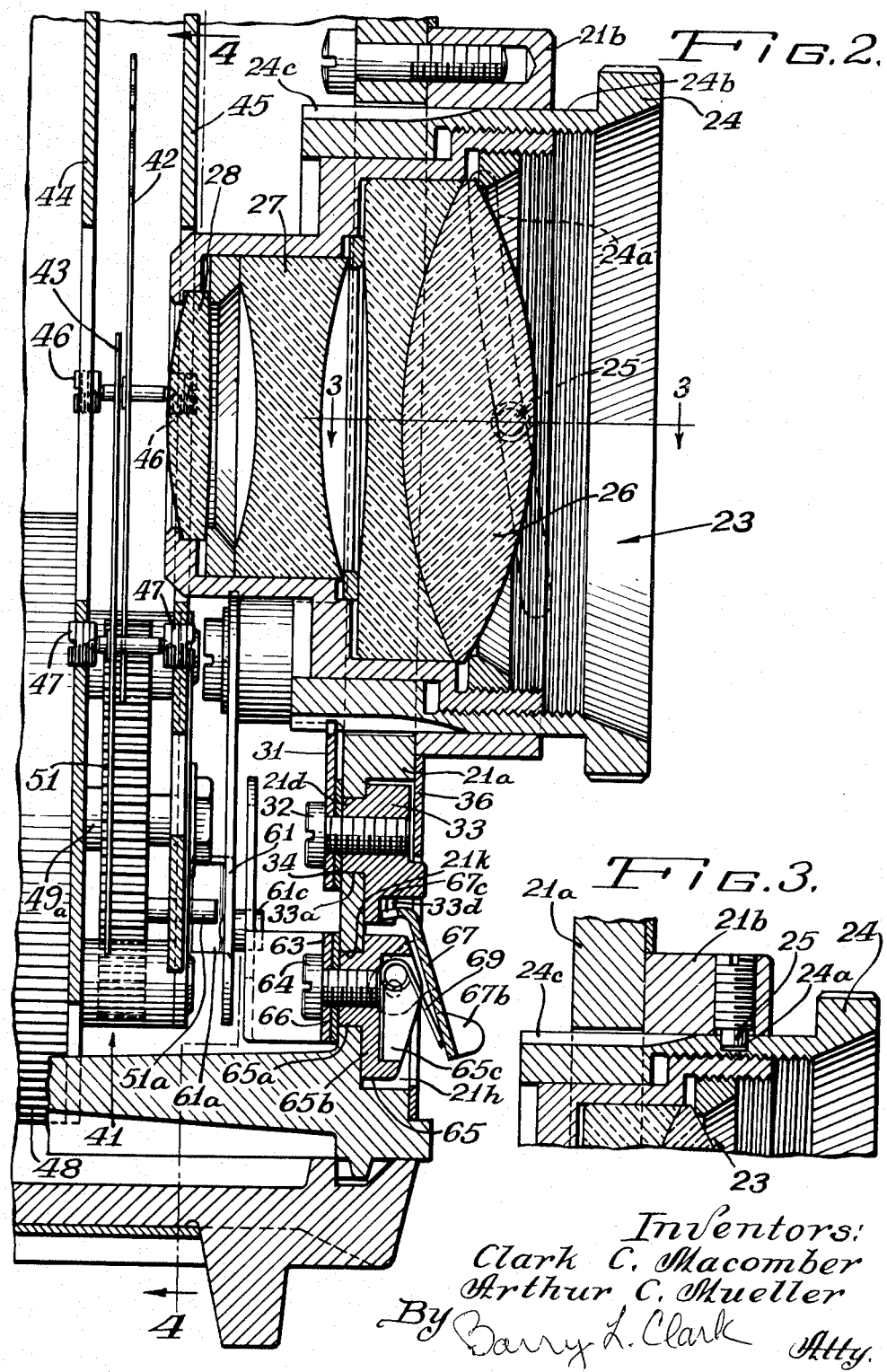

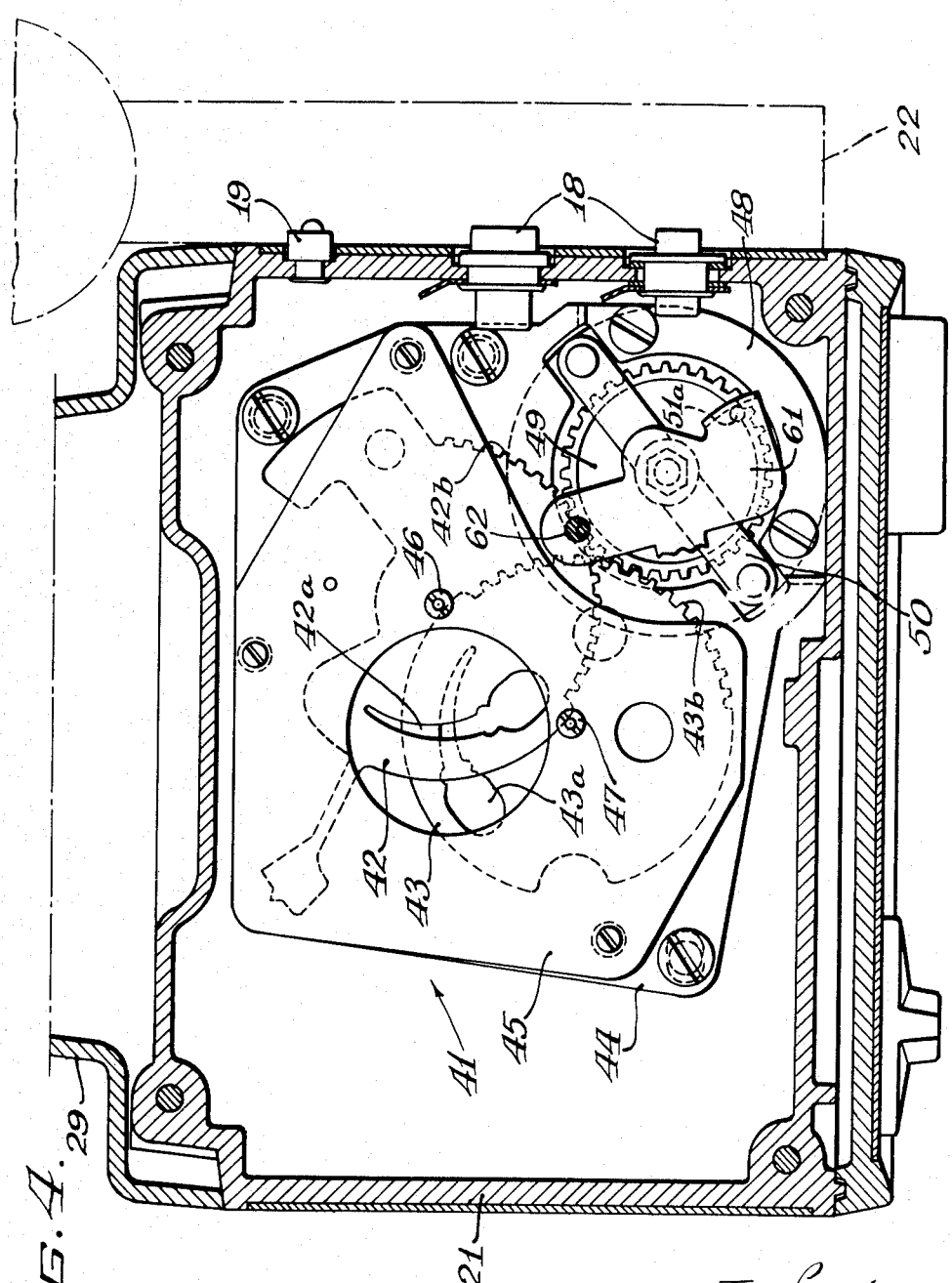

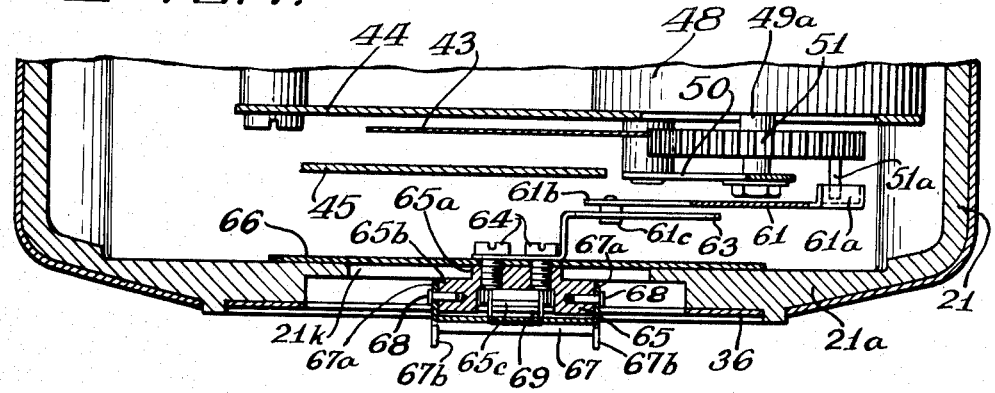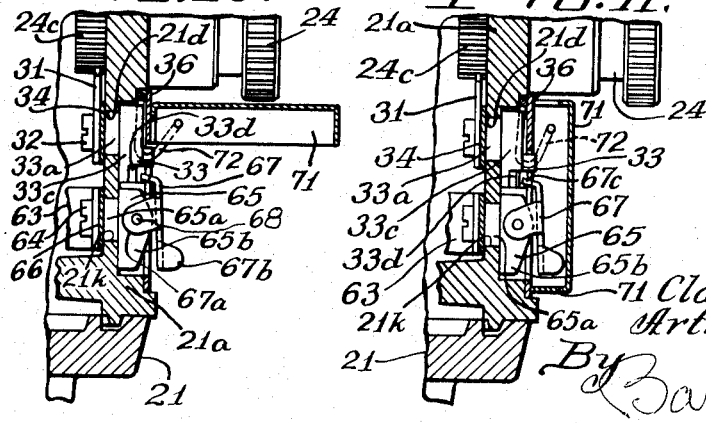

United States Patent Office 3,220,325
Patented Nov. 30, 1965

3,220,325
CAMERA
Clark C. Macomber, Evanston, and Arthur C. Mueller, Maine Township, Cook County, Ill., assignors to Bell & Howell Company, Chicago, Ill., a corporation of Illinois
Original application Oct. 12, 1959, Ser. No. 845,890, now Patent No. 3,121,379, dated Feb. 18, 1964. Divided and this application May 29, 1963, Ser. No. 289,155
5 Claims. (Cl. 95—10)

This application is a division of our copending application Serial No. 845,890, filed October 12, 1959, and now Patent No. 3,121,379.

This invention relates to a camera, and more particularly to a flash camera having a focus controlled diaphragm.

An object of the invention is to provide a variable focus camera having a flash mechanism together with a diaphragm which is set to match the focus control in taking flash pictures.

Another object of the invention is to provide an automatic exposure control normally biased toward its extreme open position together with an override mechanism which may be selectively interlocked with the focusing mechanism when a flash picture is to be taken.

Another object of the invention is to provide a focusing camera which automatically adjusts the diaphragm for a flash picture when the focusing is effected.

Another object of the invention is to provide a camera in which a diaphragm normally is biased toward its extreme open condition and may be controlled by a light sensitive device or, selectively, for a flash picture, by a manually operable focusing mechanism.

A complete understanding of the invention may be obtained from the following detailed description of a camera forming a specific embodiment thereof, when read in conjunction with the appended drawings, in which:

FIG. 1 is a fragmentary, front elevation view of a camera forming one embodiment of the invention;

FIG. 2 is an enlarged, fragmentary vertical sectional view taken along line 2—2 of FIG. 1;

FIG. 3 is an enlarged, fragmentary horizontal sectional view taken along line 3—3 of FIG. 2;

FIG. 4 is a vertical sectional view taken along line 4—4 of FIG. 2;

FIG. 7 is a fragmentary, horizontal sectional view taken along line 7—7 of FIG. 1;

FIG. 8 is a fragmentary, horizontal sectional view taken along line 8—8 of FIG. 1;

FIG. 9 is a fragmentary, front elevation view of the camera of FIG. 1 illustrating primarily the focus indicating scale and flash guide number manual control device of the exposure control device;

FIG. 10 is an enlarged fragmentary, vertical sectional view taken along line 10—10 of FIG. 9; and FIG. 11 is a view similar to FIG. 10 with a cover open.

Figure 5:
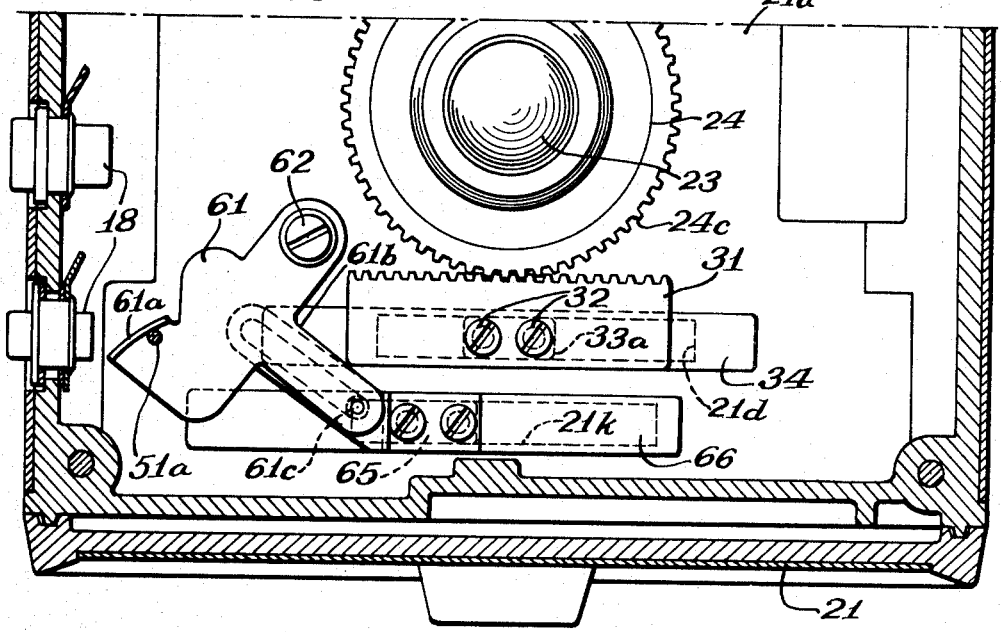
FIG. 5 is a fragmentary, vertical sectional view of the camera of FIG. 1 with a flash setting controlled diaphragm adjusting mechanism in one position.
Figure 6:
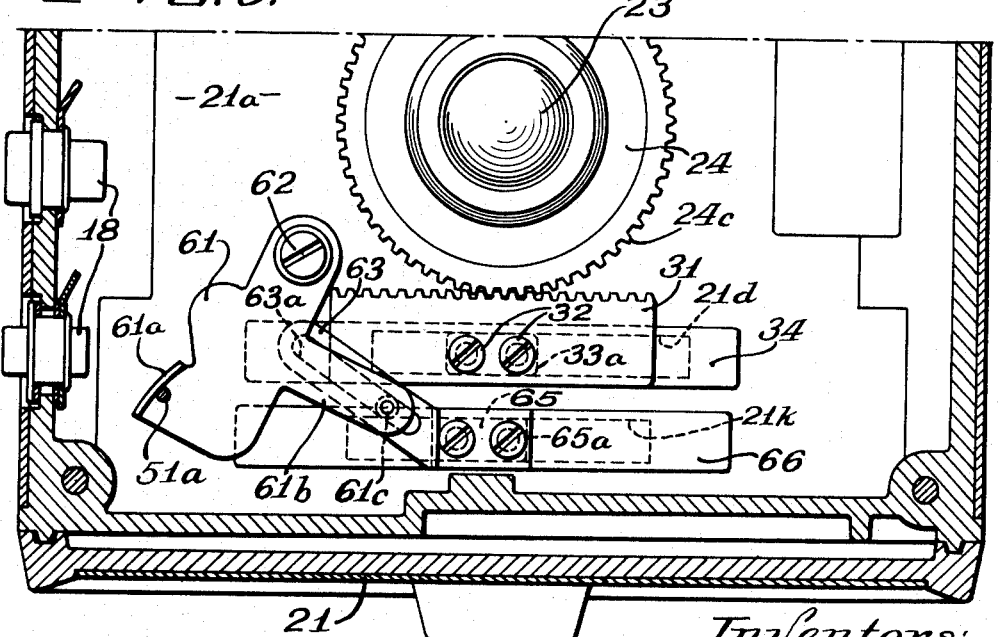
FIG. 6 is a view similar to FIG. 5 but with the diaphragm adjusting mechanism in another position.

The invention provides a variable focus camera having focus indicator together with a flash guide number indicator which is adjustable manually relative to the focus indicator and which sets the diaphragm of the camera for proper exposure for a flash picture. Preferably the flash guide number indicator may be selectively locked to the focus indicator to be moved by focusing to adjust the diaphragm and be completely disconnected from the focus indicator to permit automatic setting of the diaphragm by a photo-electric device. In one embodiment of the invention, the focus indicator has a rack which meshes with a pinion of a focusing ring and the flash guide number indicator has a detent for detachably locking the flash guide number indicator to the focus indicator in a selected position relative thereto. The flash guide number indicator preferably has a slotted member which pivots a camming lever in a direction closing the diaphragm against a biasing spring, and the flash guide number indicator may be moved to an inoperative position completely out of engagement with the focus indicator and also out of engagement with the diaphragm except when the latter is wide open.

Referring now in detail to the drawings, there is shown therein a camera having a housing 21 provided with a front wall 21a. A known flash unit 22 is adapted to be mounted on the housing and electrically connected to a shutter controlled switch (not shown) of a known type and having connectors 18 and a mounting stud 19. The unit 22 is of the flash bulb type. A variable focus objective or lens 23 is mounted by a focusing lens mount 24 which is mounted rotatably and axially slidably in a tubular guide 21b (FIG. 2) of the front wall 21a of the housing. The lens mount 24 has two oppositely disposed peripheral cam slots 24a into which project two aligned pins 25 fixed to the guide 21b. Hence, when the mount 24 is turned in the guide 21b, the mount is moved farther into or out of the housing 21 to effect a change in focus relative to the film plane (not shown) which is in a fixed position in the rear of the camera. The objective 23 includes components 26, 27 and 28. The lens mount 24 preferably has a portion 24b provided with indicia of which the uppermost is visible from viewfinder 29 (FIG. 1) to indicate the setting or focus of the mount 24.

The lens mount 24 also has a gear or pinion portion 24c (FIGS. 2 to 5) which meshes with a rack 31. The rack is secured by two screws 32 to a focus indicator 33 which has a somewhat elongated slide portion 33a slidable along elongated slot 21d. The rack also stresses an elongated leaf spring cover or mask 34 against the wall 21a. The cover 34 is sufficiently longer than the slot 21d to cover the slot entirely even at both extremes of the movement of the rack 31 by the pinion 24c. The indicator 33 has on the front thereof an indicating line 33b which co-operates with a footage scale 36a on a panel 36 fixed to the front wall 21 to indicate the focus of the lens. An enlarged head portion 33c of the indicator is adapted to engage end walls 21f and 21g of a counterbore or recess 21h in the front wall to limit the extremes of focus.

An exposure control device 41 (FIGS. 2 and 4) includes a pair of diaphragm discs 42 and 43 having aperture slots 42a and 43a which intersect on the optical axis behind the objective 24. The exposure control device 41 is positioned ahead of a known shutter (not shown) and is generally similar to those disclosed and claimed in Bagby et al. Patents 2,841,064 and 2,858,754 and copending application Serial No. 744,998, filed June 27, 1958, by Arthur C. Mueller et al. and assigned to the common assignee and now Patent No. 3,099,198. The exposure control device includes a pair of mounting plates 44 and 45 which are secured in fixed positions in the camera housing 21 and which mount the diaphragm plates 42 and 43 rotatably in bearings 46 and 47. The plate 44 also mounts a galvanometer magnet or stator 48 in which a galvanometer coil 49 is rotatably mounted by a bearing strap 50 and has a shaft 49a carrying a gear 51 keyed thereto which meshes with gears 42b and 43b formed on the diaphragm blades 42 and 43 to drive the blades by the galvanometer. The gear 51 has a pin 51a fixed thereto. The exposure control device normally is driven automatically by a photo-electric cell (not shown) mounted on and facing forwardly of the camera as shown and described in the above mentioned co-pending application Serial No. 744,998. The coil 49 is biased by a known spring (not shown) in a counter-clockwise direction, as viewed in FIG. 4, to tend to rotate the blades 42 and 43 to extreme open positions providing the largest aperture.

When the camera is used in a condition where the natural scene lighting is proper for the exposure, the photocell responds to the illumination to drive the galvanometer coil to a position providing the proper diaphragm opening for the scene lighting. However, where a flash picture is to be taken, the diaphragm usually must be stopped down further than the normal scene lighting would effect automatically through the photocell. For flash pictures, a manual override of the exposure control device 41 is provided. This override includes a lever 61 pivoted on post 62 secured to the front plate 21a and having a cam drive plate 61a adapted to engage the pin 51a to drive the coil 51 in the direction stopping down the diaphragm opening when the lever 61 is rotated in a counter-clockwise direction, as viewed in FIG. 5, against the bias of the galvanometer spring. The lever 61 also has a follower arm 61b provided with a pin 61c fixed thereto. The pin 61c fits into a cam slot 63a in a driver plate 63 fixed by screws 64 to a slide 65 slidable along a guide slot 21k which parallels the slot 21d. The plate 63 holds a leaf spring cover or mask 66 against the plate 21a to prevent entrance of light into the interior of the camera through the slot 21k in all positions of the slide 65. The slide 65 has a somewhat elongated slide portion 65a fitting closely and slidably in the slot 21k, and also has an enlarged head 65b.

A detent plate 67 is provided to selectively hold the manual override mechanism in an inoperative position as illustrated in FIGS. 9 and 11 and in an operative position interlocking the manual override mechanism to the focusing mechanism for drive thereby as illustrated in FIGS. 1 and 2. The detent plate is mounted pivotally on the head 65b of the slide 65 by pins 68 (FIGS. 8 and 10) projecting through mounting ears 67a of the detent plate, and is biased relative to the slide 65 in a counter-clockwise direction, as viewed in FIG. 2, by a torsion spring 69 mounted in a recess 65c. The detent plate also has forwardly projecting ears or tabs 67b to facilitate manually sliding the slide 65 along the guide slot 21k. The plate 67 has teeth 67c adapted to fit into complementary notches 33d (FIGS. 2 and 9) in the slide 33 to lock the slides 33 and 65 together. Then, as the lens mount 24 is turned to focus the objective on the object as indicated by mark 33b (FIG. 9) and the scale 36a, the slide 65 is moved with the slide 33 and, through the pin and slot connection between the driver plate 63 and lever 61 and the cam drive plate 61a and the pin 51a of the galvanometer, rotates the diaphragm plates 42 and 43 to reduce the aperture to the desired setting for the flash exposure to be made. The detent plate 67 may be selectively connected to the slide 33 with the mark 33b aligned with the desired one of the flash guide number marks 67e, thus providing for different flash bulbs and different film speeds. For each of these selective connections between the slides 33 and 65, the end wall 21f of the recess 21h acts to stop either the left hand end of the slide 33 or the left hand ear 67a to define one end of the permitted focusing range for the selected connection, and the shoulder 21g acts to stop either the right hand end of the slide 33 or the right hand end of the plate 67 to define the other limit of focusing for the selected connection.

When the camera is not to be used for flash operation, the plate 67 is manually pivoted out of engagement with the slide 33. The slide 65 then is slid to the right, as viewed in FIG. 1, to the position thereof shown in FIG. 9 where color coded arrows 21m and 67f are aligned, and then the plate 67 is released to permit a wide, end detent 67g (FIG. 8) to enter a wide notch 21n in the wall 21. The detent 67g enters the notch 21n to lock the manual override in inoperative position in which the cam plate 61a (FIG. 1) is at the extreme end of the range of travel of the pin 51a of the galvanometer coil 51. In this position, the notched wall 21 holds the detent teeth 67c out of the path of the slide 33 as illustrated in FIG. 10 so that independent focusing may be performed. The detent tooth 67g and notch 21n are considerably wider than the teeth 67c and notches 33d so that only the teeth 67c will enter the notches 33d and the tooth 67g will not. This limits connection between the slides 33 and 67 to those desired for the flash guide number scale marks 67e on the plate 67.

If desired, the lower portion of the plate 67 may have a vertical line or arrow thereon and an f/number scale be engraved on the portion of the panel 36 just below the path of the plate 67 and the f/number will be indicated during manual operation of the exposure control device. This would also permit manual setting of the diaphragm but after the focusing has been made in each instance.

A cover 71 (FIGS. 10 and 11) may be pivotally mounted on front wall 21a by an over-center spring connection 72, and serves to cover the slides 33 and 67 when desired The cover 71 has two over-center positions as shown in FIGS. 10 and 11, one being open and the other closed.

The above exposure control device may be operated automatically with the focusing effected completely independently of the diaphragm setting, or, alternately, the manual override may be selectively locked to the focusing mechanism for a given flash guide number and the focusing mechanism used to set the diaphragm as an incident to providing the desired focus. Also, for any given interlock between the manual override and the focusing mechanism, the limits of the focusing range are automatically provided.

While the invention is thus described, it is not wished to be limited to the precise details described, as changes may be readily made without departing from the spirit of the invention.

What is claimed is:

1. In a camera, a variable focus objective, rotatable means for varying the focus of the objective, movable indicator means movable by the rotatable means, stationary indicator means operable with the movable indicator means to indicate the setting of the objective, an adjustable diaphragm for controlling the light traveling through the objective, means biasing the diaphragm toward its extreme open position, photo-electric means for moving the diaphragm against the biasing means, and means selectively operable to connect the movable indicator means to the diaphragm for manual control of the diaphragm and to disconnect the movable indicator means from the diaphragm to permit automatic control of the diaphragm.

2. In a camera, a camera housing, a variable focus objective mounted in the housing, shutter means, flash means operable in synchronism with the shutter means, a rotatable lens mount for varying the focus of the objective, an indicator slide slidable along the housing, rack and pinion means for driving the slide by rotation of the lens mount, diaphragm means biased toward the extreme open position thereof, light-regulated means for moving the diaphragm means against the bias thereof, slide means operable independently of said light-regulated means and slidable along the housing parallel to the path of the indicator slide for moving the diaphragm means against the bias thereof, and means for indicating the relative positions of the slide means and the indicator slide.

3. In a camera, a camera housing having a front wall having a lens opening and also provided with a first guideway and a second guideway parallel to one another and extending through the front wall, a lens, a lens mount mounted rotatably in the lens opening for focusing the lens, a focus indicator member coupled to the lens mount and extending through the first guideway and movable therealong, a flash unit operable in synchronism with the operation of the camera, an adjustable diaphragm biased toward its extreme open position, light-controlled means for automatically adjusting the diaphragm, a flash guide member slidable along the second guideway, manually operable detent means for selectively drivingly connecting the flash guide member to the focus indicator member and to hold the flash guide member at one end of the second guideway and disconnected from the focus indicator member, and coupling means for connecting the flash guide member drivingly to the diaphragm when the flash guide member and the focus indicator member are drivingly connected to one another.

4. The camera of claim 3 wherein the detent means includes a first tooth of a predetermined width and a second tooth of a greater width, the focus indicator member having a notch therein of a width capable of receiving the first tooth but not the second tooth, the front wall having a notch therein of a width capable of receiving the second tooth.

5. In a camera having an objective and adjustable automatic exposure control means, the combination comprising: an adjustable diaphragm, light-controlled means for automatically adjusting the diaphragm, a flash unit operable in synchronism with the operation of the camera, distance scale means, flash guide means having flash guide number scale means thereon and manually movable relative to said distance scale means, said flash guide means being movable between an operative range wherein it is adapted to be selectively locked to said distance scale means and an inoperative position wherein it is disengaged from said distance scale means to permit the diaphragm to be automatically controlled by the light-controlled means, said flash guide means being in operative relationship with said diaphragm when in its operative range for manually adjusting the diaphragm, whereby said diaphragm will be adjusted from its largest to its smallest opening as said flash guide means is moved from one portion of said distance scale means to another.

References Cited by the Examiner

UNITED STATES PATENTS

| | | | |
|---|---|---|---|
| 2,351,834 | 6/1944 | Phillips | 95—64 |
| 2,369,199 | 2/1945 | Aiken | 95—64 |
| 2,974,576 | 3/1961 | Hahn | 95—64 |

NORTON ANSHER, *Primary Examiner.*